United States Patent [19]

Gaskell

[11] Patent Number: 5,007,840
[45] Date of Patent: Apr. 16, 1991

[54] OPERATIONS PROCESSOR

[76] Inventor: Martin Gaskell, 21 Western Road, Tring, Herts., HP23 4BQ, United Kingdom

[21] Appl. No.: 449,554

[22] Filed: Dec. 12, 1989

[30] Foreign Application Priority Data

Dec. 14, 1988 [GB] United Kingdom ................ 8829200

[51] Int. Cl.$^5$ .............................................. G09B 19/02
[52] U.S. Cl. ..................................... 434/206; 434/188
[58] Field of Search ............... 434/206, 198, 199, 209, 434/191, 188, 215

[56] References Cited

U.S. PATENT DOCUMENTS

| 613,432 | 11/1898 | Szenhak | 434/209 X |
| 924,406 | 6/1909 | Walker | 434/198 X |
| 1,158,774 | 11/1915 | Beard | 434/209 X |
| 1,161,685 | 11/1915 | James | 434/209 X |
| 1,720,499 | 7/1929 | Walker . | |
| 4,714,429 | 12/1987 | Phillips . | |

FOREIGN PATENT DOCUMENTS

| 477435 | 11/1947 | Belgium . | |
| 840020 | 5/1952 | Fed. Rep. of Germany . | |
| 889223 | 6/1953 | Fed. Rep. of Germany . | |
| 602537 | 3/1926 | France | 434/209 |
| 117178 | 11/1925 | Switzerland . | |
| 897128 | 4/1958 | United Kingdom . | |
| 1201273 | 8/1970 | United Kingdom . | |
| 1235923 | 6/1971 | United Kingdom . | |
| 1352129 | 5/1974 | United Kingdom . | |
| 1390155 | 4/1975 | United Kingdom . | |

Primary Examiner—Richard J. Apley
Assistant Examiner—Rachel M. Healey

[57] ABSTRACT

An operations processor for facilitating memory of the 12 times table. The operations processor comprises two concentric cylinders, the inner cylinder having marked thereon a periodical array of numbers. The outer clinder arranged for indicating one of the operands and the solution to a particular multiplication. A user merely twists and raises or lowers the inner cylinder with respect to the outer cylinder thereby displaying any sum of the 12 times table.

3 Claims, 1 Drawing Sheet

| 1 | 2 | 3 | 4 | 5 | 6 | 7 | 8 | 9 | 10 | 11 | 12 |
|---|---|---|---|---|---|---|---|---|----|----|----|
| 0 | 0 | 0 | 0 | 0 | 0 | 0 | 0 | 0 | 0  | 0  | 0  |
| 1 | 1 | 1 | 1 | 1 | 1 | 1 | 1 | 1 | 1  | 1  | 1  |
| 2 | 2 | 2 | 2 | 2 | 2 | 2 | 2 | 2 | 2  | 2  | 2  |
| 3 | 3 | 3 | 3 | 3 | 3 | 3 | 3 | 3 | 3  | 3  | 3  |
| 4 | 4 | 4 | 4 | 4 | 4 | 4 | 4 | 4 | 4  | 4  | 4  |
| 5 | 5 | 5 | 5 | 5 | 5 | 5 | 5 | 5 | 5  | 5  | 5  |
| 6 | 6 | 6 | 6 | 6 | 6 | 6 | 6 | 6 | 6  | 6  | 6  |
| 7 | 7 | 7 | 7 | 7 | 7 | 7 | 7 | 7 | 7  | 7  | 7  |
| 8 | 8 | 8 | 8 | 8 | 8 | 8 | 8 | 8 | 8  | 8  | 8  |
| 9 | 9 | 9 | 9 | 9 | 9 | 9 | 9 | 9 | 9  | 9  | 9  |
| 10 | 10 | 10 | 10 | 10 | 10 | 10 | 10 | 10 | 10 | 10 | 10 |
| 11 | 11 | 11 | 11 | 11 | 11 | 11 | 11 | 11 | 11 | 11 | 11 |
| 12 | 12 | 12 | 12 | 12 | 12 | 12 | 12 | 12 | 12 | 12 | 12 |

| 0 | 0 | 0 | 0 | 0 | 0 | 0 | 0 | 0 | 0 | 0 | 0 |
|---|---|---|---|---|---|---|---|---|---|---|---|
| 1 | 2 | 3 | 4 | 5 | 6 | 7 | 8 | 9 | 10 | 11 | 12 |
| 2 | 4 | 6 | 8 | 10 | 12 | 14 | 16 | 18 | 20 | 22 | 24 |
| 3 | 6 | 9 | 12 | 15 | 18 | 21 | 24 | 27 | 30 | 33 | 36 |
| 4 | 8 | 12 | 16 | 20 | 24 | 28 | 32 | 36 | 40 | 44 | 48 |
| 5 | 10 | 15 | 20 | 25 | 30 | 35 | 40 | 45 | 50 | 55 | 60 |
| 6 | 12 | 18 | 24 | 30 | 36 | 42 | 48 | 54 | 60 | 66 | 72 |
| 7 | 14 | 21 | 28 | 35 | 42 | 49 | 56 | 63 | 70 | 77 | 84 |
| 8 | 16 | 24 | 32 | 40 | 48 | 56 | 64 | 72 | 80 | 88 | 96 |
| 9 | 18 | 27 | 36 | 45 | 54 | 63 | 72 | 81 | 90 | 99 | 108 |
| 10 | 20 | 30 | 40 | 50 | 60 | 70 | 80 | 90 | 100 | 110 | 120 |
| 11 | 22 | 33 | 44 | 55 | 66 | 77 | 88 | 99 | 110 | 121 | 132 |
| 12 | 24 | 36 | 48 | 60 | 72 | 84 | 96 | 108 | 120 | 132 | 144 |

OPERATIONS PROCESSOR

BACKGROUND OF THE INVENTION

The present invention relates to an operations processor and in particular, but not exclusively, to an operations processor such as a multiplication processor.

Mathematical tables are known in the art to aid teachers and mathematicians alike for providing the solution to routine operations. Such mathematical tables include a multiplication table, a square root table, a table of squares, logarithms, trigonometric functions, exponential functions tables and the like. Recently electronic calculators have replaced traditional mathematical tables. One known disadvantage with using electronic calculators is that persons do not learn the tables and become familiar with them.

SUMMARY OF THE INVENTION

The present invention seeks to provide an operations processor which facilitates learning of mathematical tables.

According to the present invention there is provided an operations processor comprising at least two concentric cylinders, at least one first cylinder having marked thereon a periodical array of numbers and at least one further cylinder having two or more indicating means, each for indicating a number marked on the first cylinder, such numbers being indicated representing an operand or a solution of an operation.

Preferably the operation is multiplication to facilitate teaching of the 1 to 12 times table.

BRIEF DESCRIPTION OF THE INVENTION

By way of example only, an embodiment of the present invention will now be described with reference to the accompanying drawing, of which:

DESCRIPTION OF THE PREFERRED EMBODIMENT

Figures 1, 2:
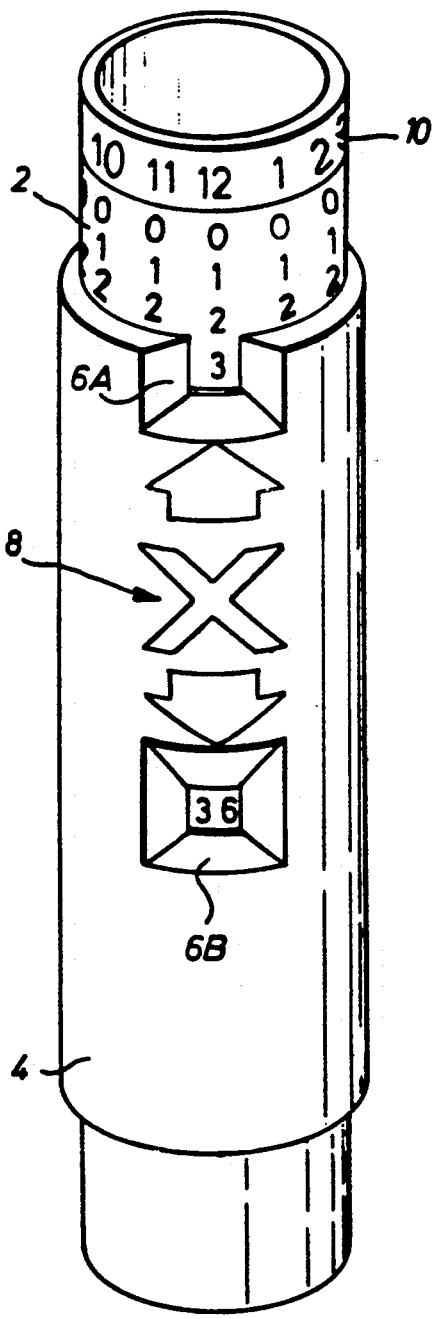
FIG. 1 is a schematic diagram of the embodiment of the present invention.
FIG. 2 is a schematic diagram of a periodical array of numbers according to the embodiment.

Referring to FIG. 1, the embodiment of the present invention comprises a first cylinder 2 upon which a periodical array of numbers is marked or printed. The complete periodical array of numbers is illustrated in FIG. 2. The embodiment also includes a further cylinder 4 such that the cylinders 2, 4 are concentric and continuous. The further cylinder 4 includes two indicating means 6. One indicating means 6a indicates an operand and the other indicating means 6b indicates the solution. The operator 8 of the operation, which in this case is a multiplier, is marked or printed on the surface of the further cylinder 4.

The operations processor is used in the following fashion to obtain the solution to a multiplication:

A first operand, which is marked or printed on an upper ring 10 of the first cylinder 2 is positioned directly above the first indicating means 6a;

A second operand is found by twisting and raising or lowering the first cylinder 2 with respect to the further cylinder 4 so as to position the second operand to be indicated by the indicating means 6a;

A solution of the operation is indicated by other indicating means 6b.

In the embodiment illustrated in FIG. 1, the first operand is the number 12, the second operand is the number 3 and naturally the solution to this operation is 36 as indicated by the indicating means 6b.

The present invention is particularly advantageous for providing a teaching aid to those persons learning their muliplication tables. Other operations may be processed, such as addition, division and subtraction.

The foregoing description has been given by way of example only, and it will be appreciated by persons skilled in the art that modifications may be made without departing from the scope of the present invention. One such modification may comprise of three or more cylinders, for enabling the processor to process a number of operations. Another such modification is the use of the first cylinder to provide storage. A closable cap may be provided at one end thereof. The present invention could thus provide not only an operations processor but also a pencil/pen case.

I claim:

1. A multiplication operations processor comprising at least two concentric cylinders, the first of said cylinders having marked thereon a periodical array of numbers which comprises a first table having a first row of numbers representing a first operand and a column of numbers representing a second operand under each number of said first row and a second table displayed under said first table representing a solution to a multiplication of said first and second operands in which the first row of said first table comprises the numbers 1 to 12 consecutively and inclusively and each of the columns comprises numbers 0 to 12 consecutively, and said first of said cylinders retained within the second of said cylinders, and the second of said cylinders having two or more indicating means, and the first of said indicating means exposing the second operand and the second of said indicating means exposing the solution of said multiplication operation.

2. An operations processor as claimed in claim 1, in which said indicating means comprises a window in said further cylinder.

3. An operations processor as claimed in claim 1, in which said second table comprises a 12 times multiplication table and each column of said second table is displayed directly beneath a respective column of said first table.

* * * * *